United States Patent [19]
Durham et al.

[11] 3,730,971
[45] May 1, 1973

[54] BUS DUCT CONVERTIBLE FROM A.C. USE TO D.C. USE

[75] Inventors: Daniel R. Durham, Beaver Falls, William W. Hamilton, Beaver, both of Pa.

[73] Assignee: Westinghouse Electric Corporation, Pittsburgh, Pa.

[22] Filed: Apr. 28, 1971

[21] Appl. No.: 248,475

[52] U.S. Cl. ............. 174/68 B, 174/88 B, 307/147, 339/19, 339/22 B, 339/31 R
[51] Int. Cl. .......................... H02g 5/06, H01r 29/00
[58] Field of Search .............. 174/16 B, 68 B, 70 B, 174/71 B, 72 B, 88 B, 99 B; 307/147; 339/19, 22 B, 24, 31 R, 31 M, 32 R, 32 M, 153

[56] References Cited
UNITED STATES PATENTS

| | | | |
|---|---|---|---|
| 3,444,311 | 5/1969 | Weimer et al. | 174/68 B |
| 3,446,911 | 5/1969 | Jorgensen | 174/88 B |
| 3,459,872 | 8/1969 | Weimer et al. | 174/88 B X |
| 3,683,313 | 8/1972 | Weimer et al. | 174/88 B X |

*Primary Examiner*—Laramie E. Askin
*Attorney*—A. T. Stratton et al.

[57] ABSTRACT

A bus duct section characterized by four bus bars insulated from each other and within a housing the end portions of which are uninsulated and adapted for overlapping connection with corresponding bus bars of other similar sections, each outer pair of bus bars having conducting spacers between the end portions thereof, whereby the bus duct may be converted from a three-phase four wire alternating-current unit to a two pole direct current bus duct.

9 Claims, 3 Drawing Figures

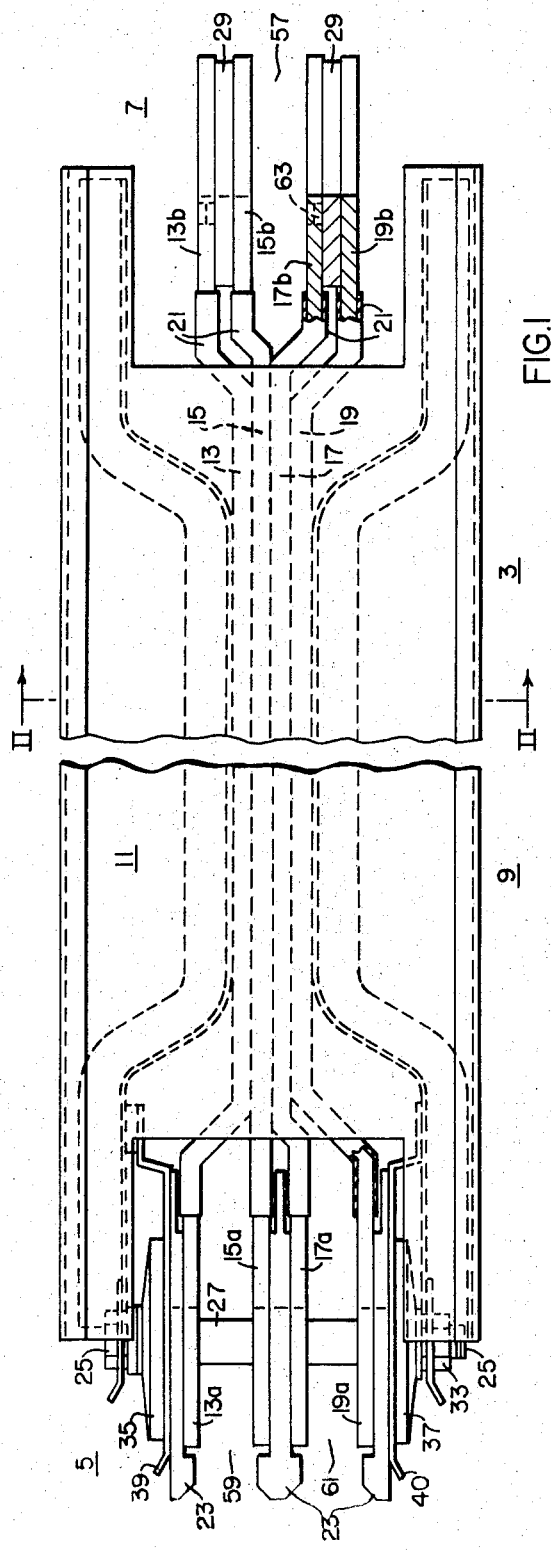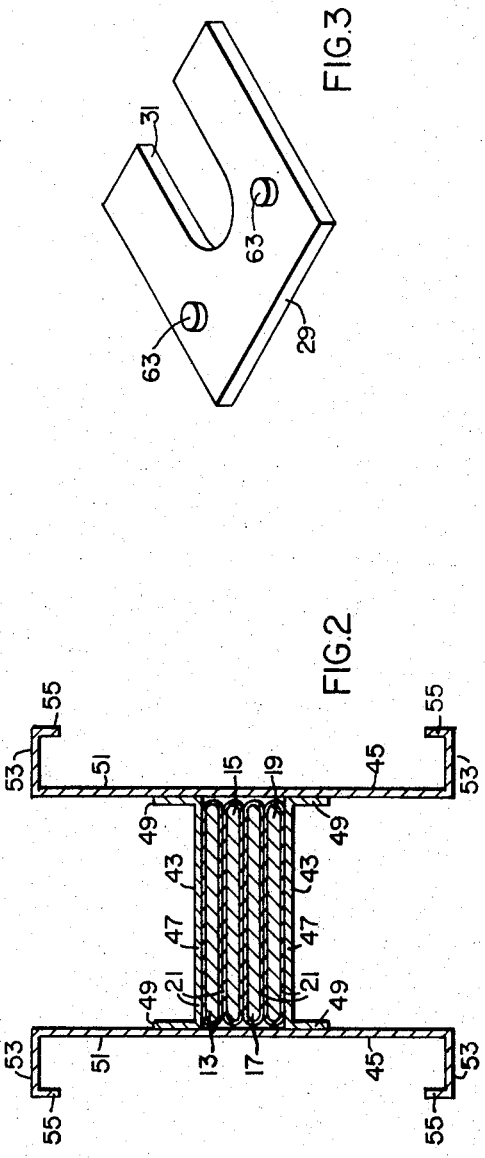

BUS DUCT CONVERTIBLE FROM A.C. USE TO D.C. USE

BACKGROUND OF THE INVENTION

1. Field of the Invention

This invention relates to bus duct and more particularly to three-phase, four wire bus duct structure which is adapted for use as a two pole direct current bus duct structure.

2. Description of the Prior Art

Bus ducts of various types are disclosed in U.S. Pat. Nos. 3,459,872 and 3,444,311 in which a plurality of bus bars are sandwiched between opposite housing members in compact relationship with each other to facilitate heat dissipation.

Bus ducts of the type involved are usually manufactured for alternating current supply. Indeed, the demand for bus duct using alternating current in industrial, commercial, and apartment type buildings is sufficiently large that bus ducts for direct current use are manufactured on a modest basis, if at all.

SUMMARY OF THE INVENTION

In accordance with this invention it has been found that the foregoing problem may be overcome by providing a bus duct construction comprising a plurality of bus bars, such as four, which are electrically insulated from each other and which are provided with opposite end portions which are connectable with complementary end portions of adjacent similar bus ducts, and conductor spacers being provided between the end portions of adjacent pairs of bus bars, whereby a bus duct which is normally provided for alternating current use is converted to a direct current bus duct.

The advantage of the bus duct of this invention is that a conventional alternating current plug-in type four wire or conductor bus duct may be converted to a direct current plug-in type two pole duct by the replacement of conventional insulation spaces in the end portions of certain of the bus bars by electrically conducting spacers. For example, a four wire bus duct capable of conducting 1000 amperes may be converted at its connecting joint with adjacent similar bus ducts to a two pole direct current bus duct having two bus bars per pole capable of carrying up to about 2000 amperes.

BRIEF DESCRIPTION OF THE DRAWINGS

FIG. 1 is a side view, with parts broken away, of a section of bus duct constructed in accordance with the principles of this invention;

FIG. 2 is a vertical sectional view taken on the line II—II of FIG. 1; and

FIG. 3 is a perspective view of a conducting spacer in accordance with the invention.

DESCRIPTION OF THE PREFERRED EMBODIMENT

In FIG. 1 an enlongated section of bus duct is generally indicated at 3 and it comprises a first connecting-end part 5 at one end thereof, a second connecting end part 7 at the other end thereof, and a main body part 9 intermediate thereof. The section 3 also comprises a housing structure 11 and a set of a plurality, such as four, bus bars 13, 15, 17, and 19 supported in the housing structure. As shown in FIGS. 1 and 2, the bus bars are juxtaposed together in a compact relationship at the main body portion 9 of the section, and are offset at opposite ends 5 and 7 of the section to enable connections of the section to a similar section. Each of the bus bars 13–19 is provided with an insulating cover 21.

As shown in FIG. 1 each insulating cover 21 terminates short of the opposite ends of each bus bar 13–19 to provide uninsulated end portions to permit connection of the bus bars to bus bars of a similar section in an overlapping relationship. A plurality of rigid insulating spacers 23 are supported at the end ports 13a, 15a, 17a and 19a at the connecting end part 5 of the bus duct 3. A bolt 25 and an insulating tube 27 extends through aligned slots (not shown) in the bus bars 13–19 and in the insulating spacers 23. Likewise, end portions 13b, 15b, 17b, and 19b at the connecting end part 7 of the bus bar are provided with spacers 29 which are composed of electrically conducting material, such as copper or aluminum.

As shown in FIG. 3 the conducting spacers 29 are generally rectangular members having a slot 31 which is aligned with similar slots in the end portions 13b–19b to accommodate the insertion of the assembly of a bolt and insulating tube, such as the bolt 25 and tube 27, of an adjacent similar bus duct 3 when in a connected relationship therewith. The aligned slots in the end portions 13a–19a and insulating spacers 23 are similar to the slot 31 in the conducting spacers 29 and end portions 13b–19b. Thus, the connecting end part 7 of one section can be moved into a connecting position cooperating with the connecting end part 5 of a similar section with the bars and spacers at the connecting end part 7 straddling the bolt 25 and the insulating tube 27, and thus each bus bar of one section being in an overlapping relationship with a corresponding bus bar of the other section.

When the sections are in the connecting position, the bolt head 25 can be rotated while a nut 33 is held against rotation. In that manner a pair of spring washer members 35 and 37 are drawn toward each other to draw opposite housing parts 39 and 40 toward each other and thereby squeeze the spacers and bus bars together to physically and electrically connect the bus bars of the sections together. The means for connecting the similar sections together is more specifically described in U.S. Pat. No. 3,459,872, and assigned to the assignee of the instant application. Thus, only a brief description of the connecting means has been given herein.

The construction of the main body part 9 of the bus duct section 3 is shown more particularly in FIG. 2. The bus bars 13–19 are generally flat electrically conducting members supported in a stacked mutually flatwise face-to-face relationship. As shown, the bars are enclosed in insulating covers 21. The housing structure 11 comprises a first pair of opposite housing members 43 and a second pair of opposite housing members 45. Each of the housing members 43 is a generally U-shaped structure comprising a flat planar bight part 47 and a pair of flat planar opposite flanges 49. The flanges are secured to the housing members 45 in a suitable manner such as by spot welding or spaced bolts.

Each of the members 45 of the second pair of opposite housing members is a generally C-shaped sheet metal member and comprises a flat planar bight part 51 bent over at opposite ends thereof to provide flat planar main leg parts 53 extending normal to the plane of the bight part. The main leg part 53 is bent over to provide flat planar end parts 55 that extend inwardly toward each other parallel to the plane of the bight part 51. The manner and purpose of the construction of the housing is shown generally in U.S. Pat. No. 3,444,311, assigned to the assignee of the instant application. Only a brief description is given herein.

As shown in FIG. 1 the conducting spacers 29 are disposed between adjacent pairs of bus bars such as pairs 13 and 15 as well as pairs 17 and 19. Accordingly, when the end portions of the bus bars are secured together with corresponding bars of adjacent similar bus duct sections, the corresponding pairs of bus bars are interconnected electrically to provide a two pole bus duct adapted for direct current application. For that purpose, for example, the upper pair of bus bars 13 and 15, having conducting spacers 29 disposed between the end portions 13b and 15b for each section effectively provide one wire or conductor for the direct current supply; and the lower pair of bus bars 17 and 19 having conducting spacers 29 disposed between end portions 17b and 19b effectively provide the other wire or conductor for the direct current supply. In addition, it is point out that a space 57 is disposed between the assembly unit of the upper and lower pairs of bus bars which space is essentially equal to the thickness of the assembly of end portions 15a and 17a and insulating spacer 23 at the opposite end of the section. Likewise, similar spaces 59 and 61 are disposed between end portions 13a and 15a as well as between end portions 17a and 19a. The spaces 57, 59, and 61 are adapted to receive opposite end portions of similar sections of bus duct in order to provide for a continuing two pole direct current bus duct having two bus bars per pole whereby the upper pair of bars are electrically interconnected in parallel end for end and insulated from the lower pair of bus bars 17 and 19 in an overlapping manner.

As shown in FIG. 3, the conducting spacers 29 are of a thickness substantially equal to the thickness of the insulating spacers 23 which the conducting spacers 29 are adapted to replace. In other words, when the bus duct 3 is used for alternating current applications, the conducting spacers 29 are replaced by electrically insulating spacers 23. In order to retain the conducting spacers in place, they are provided with dimples 63 which are adapted to fit into openings of a similar size and spacing in one or both of the corresponding bus bars 13–19. In that position, the slots 31 of the spacers 29 are in alignment with corresponding slots in the bus bars 13–19.

Accordingly, the bus duct construction of the present invention solves the problem of bus ducts of prior art construction by providing for the conversion of normally alternating current bus ducts to direct current use by utilizing conducting spacers instead of insulating spacers at appropriate ends of adjacent pairs of bus bars. Finally, by providing electrically conducting spacers between adjacent pairs of bus bars, one type of bus duct may be used for either AC or DC applications as desired.

What is claimed is:

1. A section of bus duct comprising a housing, a set of a plurality of substantially flat juxtaposed bus bars supported in the housing, the bus bars comprising intermediate portions and opposite end portions, the intermediate portions being provided with insulation means for maintaining adjacent bus bars in spaced relation, the end portions being uninsulated and adapted for an overlapping connection with corresponding bus bars of other similar sections, and the end portions of at least one pair of adjacent bus bars at one end of the section being in electrical contact with each other.

2. The section of bus duct of claim 1 in which a conducting spacer is disposed between the end portions of adjacent pairs of bus bars at said one end of the section.

3. The section of bus duct of claim 1 in which a first conducting spacer is disposed between the end portions of one pair of adjacent bus bars, and a second conducting spacer is disposed between the end portions of another pair of adjacent bus bars.

4. The section of bus duct of claim 1 in which the end portions of a first adjacent pair of bus bars at one end of the section have a clearance therebetween, the end portions of a second adjacent pair of bus bars at said one end of the section having a clearance therebetween, the end portions of the first and second pairs of adjacent bus bars having a space therebetween and adapted to receive the end portions of corresponding bus bars of another similar section, and a conducting spacer in each said clearance between the end portions at said one end of the section.

5. The section of bus duct of claim 1 in which there are four bus bars, the end portions of one pair of adjacent bus bars at one end of the section being separated by a conducting spacer and forming a first unit, the end portions of the other pair of adjacent bus bars at said one end of the section being separated by a second conducting spacer and forming a second unit, the first and second units being separated by a first space, the end portions of the inner pair of bus bars at the other end of the section being separated by an insulating spacer and forming a third unit, the end portion of one outer bus bar at said other end of the section being separated from the third unit by a second space, the end portion of the other outer bus bar at said other end of the section being separated from the third unit by a third space, the first and second units being insertable respectively into the second and third spaces of an adjacent similar section, and the third unit being insertable into the first space of another adjacent similar section.

6. The section of bus duct of claim 5 in which the end portions of the first unit are disposed in planes outwardly of and parallel to the corresponding intermediate portions of bus bars, and in which the end portions of the second unit are disposed in planes outwardly of and parallel to the corresponding intermediate portions of bus bars.

7. The section of bus duct of claim 6 in which the third unit has a thickness adapted to provide electrical contact with end portions of corresponding bus bars of first and second units of an adjacent section.

8. The section of bus duct of claim 5 in which the second space is disposed between the end portions of one outer and adjacent bus bars, and the third space is disposed between the end portions of the other outer and adjacent bus bars.

9. The section of bus duct of claim 5 in which the second and third spaces are aligned with the first and second units respectively, and are adapted to receive similar units of an adjacent section.

* * * * *